United States Patent [19]
Gaw

[11] 3,960,585
[45] June 1, 1976

[54] REDUCING H₂S-EMISSION FROM HOT CAST SULFUR-ASPHALT MIXTURES

[75] Inventor: William Gaw, Burlington, Canada

[73] Assignee: Shell Oil Company, Houston, Tex.

[22] Filed: Dec. 4, 1974

[21] Appl. No.: 529,429

[30] Foreign Application Priority Data
Dec. 17, 1973 United Kingdom............... 58278/73

[52] U.S. Cl. ................................. 106/274; 106/275; 106/287 SC; 208/22; 208/44; 264/212; 264/330; 404/17; 404/32; 404/79
[51] Int. Cl.² ..................... C08L 95/00; E01C 7/00
[58] Field of Search............. 106/274, 275, 287 SC; 264/212, 330; 208/6, 22, 44; 404/17, 32, 79

[56] References Cited
UNITED STATES PATENTS

| | | |
|---|---|---|
| 491,395 | 2/1893 | Wray .................................. 106/274 |
| 3,738,853 | 6/1973 | Kopvillem et al................... 106/274 |
| 3,803,066 | 4/1974 | Petrossi......................... 260/28.5 AS |
| 3,810,857 | 5/1974 | Garrigues et al. .................. 106/274 |

*Primary Examiner*—Joan E. Welcome

[57] ABSTRACT

When cast sulfur-asphalt compositions, e.g., sulfur-asphalt-aggregate pavements and construction articles, are being prepared by mixing and/or heating mixtures comprising sulfur and asphalt at elevated temperatures not exceeding 175°C, the evolution of hydrogen sulfide is substantially reduced by carrying out the mixing and/or heating step in the presence of a hydrogen sulfide suppressant selected from the class consisting of free radical inhibitors and redox (oxidation-reduction) catalysts.

17 Claims, 3 Drawing Figures

REDUCING H₂S-EMISSION FROM HOT CAST SULFUR-ASPHALT MIXTURES

BACKGROUND OF THE INVENTION

The invention relates to an improved method of preparing cast sulfur-asphalt compositions wherein mixtures of sulfur and asphalt are mixed and/or heated at elevated temperatures to facilitate casting. More particularly, this invention is directed to a means for substantially suppressing the emission of hydrogen sulfide in the casting process described and to sulfur asphalt compositions containing agents which minimize hydrogen sulfide evolution at the high temperatures required for casting.

As described in British Pat. No. 1,363,706, mixtures of sulfur, asphalt and mineral aggregate can be successfully cast into formed compositions such as pavements and construction articles, provided the sulfur and asphalt are present at a weight ratio of at least 1:1 sulfur to asphalt and the casting is carried out without the application of densification pressures. According to this patent teaching, the mixture should not be heated above 175°C in the casting process since above this temperature a chemical reaction between sulfur and asphalt takes place accompanied with emission of hydrogen sulfide. Preferably, the mixing temperature is 150°C or lower.

It has now been observed that when working at such a temperature below, but approaching 175°C, and casting the sulfur-asphalt composition into a formed article, e.g., spreading the hot mix on the road, measurable quantities of hydrogen sulfide are evolved. Although the quantity of hydrogen sulfide amounts only to some parts per million, environmental considerations may make it desirable to reduce these hydrogen sulfide concentrations further. The instant invention provides a means or accomplishing this environmentally desirable objective.

SUMMARY OF THE INVENTION

It has now been found when cast sulfur-asphalt compositions are prepared by mixing and/or heating mixtures comprising sulfur and asphalt at elevated temperatures not exceeding 175°C that the evolution of hydrogen sulfide from the hot mixture can be substantially reduced, if a hydrogen sulfide suppressant selected from the class consisting of free radical inhibitors and redox catalysts is present in the hot mixture. Accordingly, the instant invention provides an improved process for casting sulfur-asphalt compositions by mixing and/or heating mixtures comprising sulfur and asphalt at elevated temperatures not exceeding 175°C characterized in that the mixing and/or heating step is carried out in the presence of a hydrogen sulfide suppressant selected from the class consisting of free radical inhibitors, redox catalysts and mixtures thereof. Also within the scope of the invention are sulfur-asphalt compositons containing a hydrogen sulfide suppressant of the type described in an amount which is effective to substantially suppress hydrogen sulfide evolution from the sulfur-asphalt composition at temperatures up to 175°C.

DETAILED DESCRIPTION OF THE INVENTION

As indicated above the essence of the instant invention is the discovery that conventional free radical inhibitors and redox (oxidation-reduction) catalysts will effectively suppress the formation and/or evolution of hydrogen sulfide from mixtures of sulfur and asphalt which are heated to elevated temperatures required for casting without application of densification pressure, provided the temperature does not exceed 175°C. Examples of suitable free radical inhibitors are tetra-alkylthiuram disulfide, zinc dialkyl dithiocarbamates and diphenyl guanidide. Hydroquinone can also be used but is less suitable since it tends to sublimize and thus is easily lost from the system. p-Benzoquinone and diphenyl picrylhydrazyl and diphenylamine are also useful hydrogen sulfide suppressants but their activity is less pronounced than those already mentioned. Suitable conventional redox reagents or catalysts are iodine, copper salts and copper oxides, iron salts and iron oxides and cobalt salts and cobalt oxides. Of the two classes of hydrogen sulfide supressing additives described the redox catalysts are generally preferred on a cost effectiveness basis. Of the redox catalysts, the iron chlorides, i.e., ferric chloride and ferrous chloride, appear to be the most effective and practical and are, therefore, preferred on that basis. Most preferred are the hydrated forms of ferrous and ferric chloride, i.e., $FeCl_2 \cdot 4 H_2O$ and $FeCl_3 \cdot 6H_2O$, respectively. In this regard, hydrated ferrous chloride is the optimum additive for large scale applications, i.e., pavement casting, because of its superior effectiveness and non-corrosivity. Combinations of free radical inhibitors and redox catalysts are also active hydrogen sulfide suppressants, for example a combination of copper carbonate and diphenylamine.

The particular amount of hydrogen sulfide suppressant which is added to the sulfur-asphalt composition to give the desired inhibiting effects at high temperatures is not considered to be at all critical to the invention and will vary considerably with the specific sulfur-asphalt composition employed, said composition generally also containing a mineral aggregate in addition to the sulfur and asphalt, and the extent to which hydrogen formation is to be suppressed. Generally, the quantity of suppressant will only be a minor proportion of the total sulfur-asphalt composition with amounts as low as 0.05% by weight of the total composition being sufficient to give the desired suppressant effect. For practical reasons the amount of suppressant will generally not exceed 0.5% by weight of the total composition, however, the use of larger amounts is by no means excluded from the scope of this invention should conditions warrant such use.

The temperature of the mixture containing sulfur and asphalt has some influence on the quantity of hydrogen sulfide which is emitted, a higher mixing temperature given a higher hydrogen sulfide emission. However, within the ranges of mixing temperatures contemplated by the instant invention, i.e., up to 175°C, the hydrogen sulfide suppressants according to the invention appreciably reduce the emission of hydrogen sulfide. It is preferred to use a mixing temperature of at most 150°C since at this temperature and below the quantity of hydrogen sulfide emitted can be reduced to negligible concentrations by using a hydrogen sulfide suppressant according to the invention.

It is preferred that the additives according to the invention be added to the asphalt component before it is mixed with the sulfur component. Thus, when pavement compositions containing, for example graded mineral aggregate or sand, are being prepared and the asphalt and aggregate is mixed before the sulfur is added, it is preferred to add the suppressant to the minerals, the asphalt or to the mixture of asphalt and minerals, and to add the sulfur after the suppressant has been added. However, though not the preferred sequence of addition, the quantities of hydrogen sulfide emitted can still be significantly reduced by adding the additive after the sulfur in the mixing sequence.

Sulfur asphalt mixtures suitable for use in the invention comprise sulfur, asphalt and aggregate, the weight ratio of sulfur to asphalt being at least 1:1 and preferably from about 2:1 to 5:1 or higher. Cast articles having sulfur to asphalt ratios of from 1.0:1 to 2.5:1 are particularly suitable as flexible pavements, while articles having ratios above 5:1 make suitable rigid pavements, blocks and the like. Cast articles having an intermediate ratio of 2.5:1 to 5:1 form very strong but still flexible pavements.

The sulfur employed in these mixes is elemental sulfur, that is, sulfur in the free state — not as a compound. Any of the physical forms of sulfur are satisfactory for use because the sulfur is generally mixed with the asphalt in a molten state, although it is not necessary to do so.

Asphalt materials which may be suitably employed in these mixes include any asphalt generally used in road building, particularly pyrogenous asphalts derived from petroleum residues, e.g., residual oils, blown petroleum asphalt, soft and hard residual asphalt and the like. Other pyrogenous residues such as tar and pitch may also be used as well as mixtures of such materials with asphalt. Natural asphalt such as gilsonite may also be employed. Penetration grade asphalts, that is, those having a penetration (ASTM Method D 5) of 40–300, are particularly preferred. Asphalt is employed in the mix in an amount sufficient to bind the aggregate, e.g., generally at last 3% by weight of the total composition. Mixes containing from about 4 to 7% by weight asphalt are especially suitable.

The mineral aggregate used in the mix is generally defined as particulate inorganic matter and includes sand, stone, gravel, slag and the like, which may be either acidic or basic as in the case of granite and limestone, respectively. Because of its ready availability, sand of the conventional variety found on most construction sites is a preferred mineral aggregate for use in the instant invention.

Further specific details on suitable sulfur-asphalt casting procedures in which the improvement according to the invention finds application may be found in U.S. Pat. No. 3,738,853 to Kopvillem et al (common assignee) which issued on June 12, 1973. This reference which is herewith incorporated by reference is directed specifically to a process for the production of sulfur-asphalt pavements and construction articles by casting sulfur-asphalt-aggregate mixes in forms at elevated temperatures without the application of densification pressures.

The invention, and the problem of hydrogen sulfide emission which is solved by its application, will be further described with reference to the figures and the following examples. Referring first to the figures, the emission of hydrogen sulfide from sulfur/asphalt/sand mixtures containing no suppressant (composition 18/6/76%wt) is shown in FIGS. 1, 2 and 3.

FIG. 1 is a graph showing the quantity of hydrogen sulfide (vertical axis, logarithmic scale) released from the mix versus the total mixing time (horizontal axis, mg $H_2S$/kg mixture/hour) at a mixture temperature of 143°C. The upper curve shows the quantity of $H_2S$ using nitrogen as a carrier gas, the lower curve showing the quantity of $H_2S$ using air as the carrier gas. In both cases the flow rate of the carrier gas was 20 l/hr.

Figure 3:
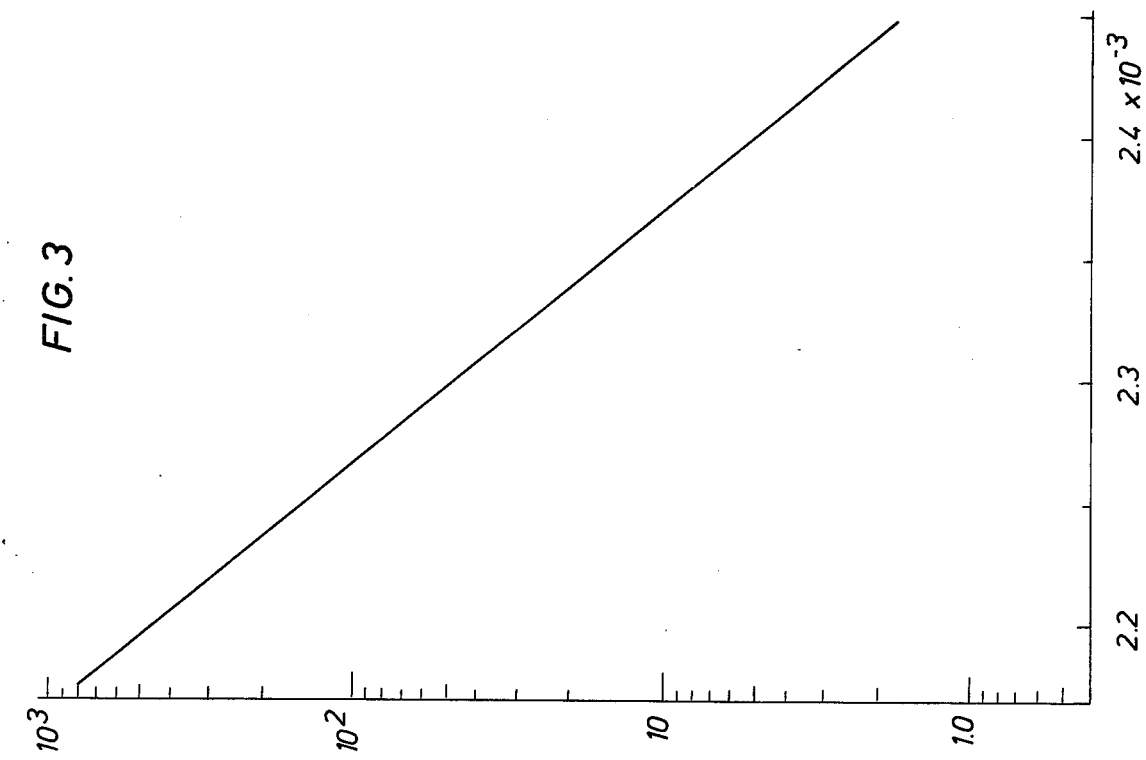
FIG. 3 shows a graph giving the relation of the quantity of hydrogen sulfide formed after 1 hour (vertical axis, logarithmic scale) and the reciprocal of the absolute temperature (horizontal axis). This graph was obtained from FIG. 2 by plotting the logarithm of the hydrogen sulfide concentration after 1 hour versus (absolute reaction temperature) $^{-1}$.
Figure 1:
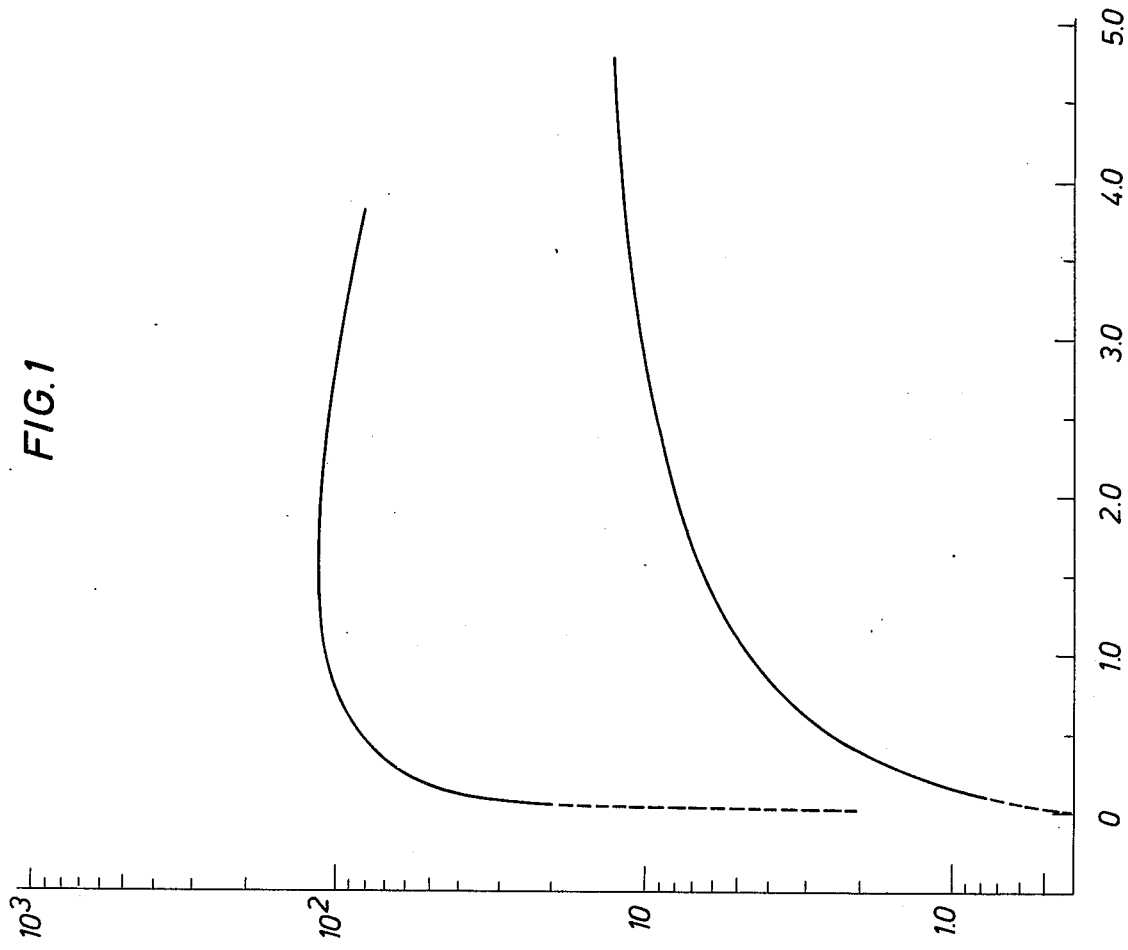
Figure 2:
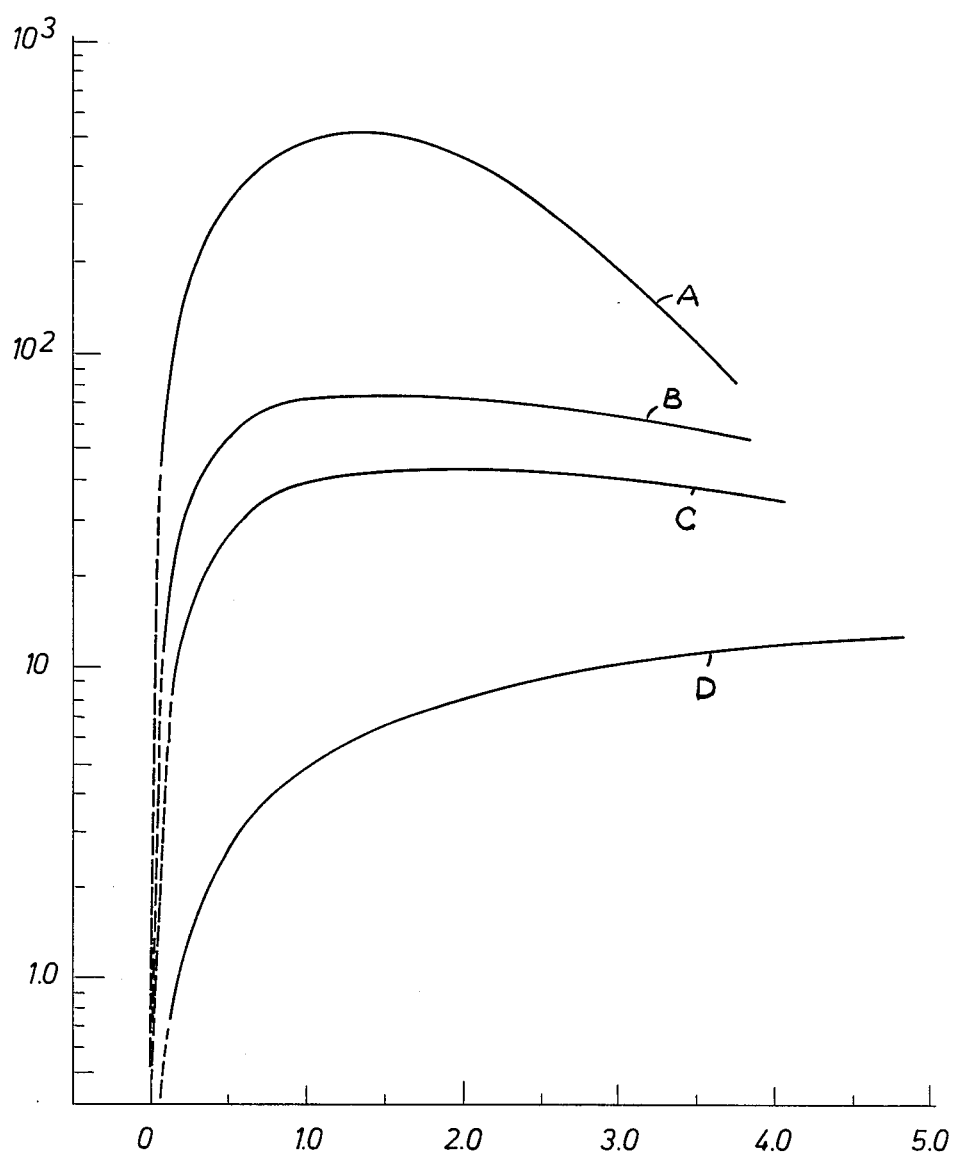
FIG. 2 is a graph showing the concentration of hydrogen sulfide in the reaction products as a function of time at different temperatures, viz. 182°C (curve A), 166°C (curve B), 160°C (curve C) and 143°C (curve D).

The data used for FIGS. 1, 2 and 3 were obtained as follows.

Sulfur/asphalt/sand mixtures (composition 18/6/76%wt) were stirred in a temperature-controlled 2-liter glass reaction vessel. The gaseous reaction products were carried to gas absorption bottles by a continuous stream of either nitrogen or air and analyzed for hydrogen sulfide.

From the results given in the figures it is apparent that a small, though environmentally significant amount of hydrogen sulfide is emitted from sulfur-asphalt mixtures maintained at temperatures which are sufficiently high to render the mixture amenable to casting, even though the temperature levels are below those previously considered to be undesirable from an $H_2S$ emission standpoint. That is, of course, in the absence of the hydrogen sulfide suppressants according to the invention.

EXAMPLE I

A sulfur/asphalt/sand mixture (composition 18/6/76%wt) with added hydrogen sulfide suppressant was stirred in a temperature-controlled 2-liter glass reaction vessel. The gaseous reaction products were carried to gas absorption bottles by a continuous stream of air at an air flow rate of 20 l/hr and analyzed for hydrogen sulfide. The temperature of the mixture was 143°C. The quantity of hydrogen sulfide measured is shown in Table I below.

TABLE I

Effects of Suppressants on $H_2S$ Emissions from Sulfur/Asphalt/Sand

| Suppressant (between brackets the quantity in %wt on mixture) | $H_2S$ emission after 1 hour (mg/kg/h) |
|---|---|
| None | 5.0 |
| Iodine/KI (0.01/0.01) | 0.1 |
| $CuCO_3$ (1.0) | 0.2 |
| $CuCO_3$ (0.1) | 1 |
| $CuCO_3$ (0.01) | 3 |
| $CuCO_3$ (0.1) + diphenylamine (0.1) | 0.6 |
| $CuCO_3$ (0.1) + diphenylamine (0.01) | 0.5 |
| CuO (0.1) | 2 |
| $FeCl_3$ (0.1) | 0.6 |
| $Fe_2(SO_4)_3$ (0.1) | 4 |
| p-benzoquinone (0.1) | 2.8 |
| Hydroquinone (0.1) | 1.4 |
| Hydroquinone (0.01) | 2.5 |
| Diphenyldipierylhydrazyl (0.025) | 3.0 |
| Tetramethylthiuram disulfide (0.1) | 0.2 |
| disulfide (0.01) | 3.0 |
| ZnO/stearic acid/diphenyl- | |

TABLE I-continued

Effects of Suppressants on H₂S Emissions from Sulfur/Asphalt/Sand

| Suppressant (between brackets the quantity in %wt on mixture) | H₂S emission after 1 hour (mg/kg/h) |
|---|---|
| guanidine (0.1/0.1/0.1) | 2.0 |

The experimental results shown in Table I show that the emission of hydrogen sulfide can be appreciably reduced by free radical inhibitors or redox catalysts according to the invention.

The experiments of Example I, while giving a good qualitative indication of the H₂S suppressing action of additives according to the invention, are not quite representative for large-scale laying of pavement, since the continuous flow of air over a stirred mixture is not typical of commercial operations. Therefore, additional experiments were carried out on a larger scale and without air-flushing, in order to simulate mixture transportation and unloading. These experiments are described in Example II.

EXAMPLE II

Batches of 50 kg of mixture were prepared at an initial temperature of 150°C in a Hobart mixer, modified to contain the evolved gases in the air space above the mixture. After the initial mixing the covered bowl containing the mixture was stored without agitation in an oven at 150°C for 30 minutes. The mixing bowl was then reassembled and the gases trapped in the mixture were expelled into the air space by means of a 30 second mixing cycle. The concentrations of H₂S and SO₂ (to study whether possibly some H₂S is oxidized to SO₂) in the air space were measured. The temperatures noted in Table II were taken after the mixing sequence and reflect the effects of mix cooling.

TABLE II

Effects of Suppressants on H₂S Emission from 50 kg Batches of a Mixture of Sulfur/Asphalt/Sand (Composition 18/6/76%wt)

| Suppressant (%wt between brackets) | Gas concentration H₂S (ppm) | Gas concentration SO₂ (ppm) | Mixing temperature, °C |
|---|---|---|---|
| None | 40 | 0 | 126 |
| Tetramethylthiuram-disulfide (0.05) | 0 | 0 | 123 |
| Hydroquinone (0.1) | 20 | 0 | 124 |
| Zinc diethyldithio-carbamate (0.2) | 0 | 0 | 126 |
| Zinc diethyldithio-carbamate (0.06) | 4 | 0 | 126 |
| Iodine (0.01)/KI (0.01)/ethylene glycol (0.08) | 0 | 0 | 129 |
| Iodine (0.002)/KI (0.002)/ethylene glycol (0.016) | 25 | 1 | 131 |
| CuCO₃ (0.1) | 4 | 0 | 120 |
| CuCO₃ (0.01) | 20 | 0 | 121 |
| Fe₂S₃ (0.1) | 0 | 0 | 127 |
| FeS (0.1) | 12 | 5 | 127 |
| FeCl₃.6H₂O (0.1) | 0 | 0 | 130 |
| FeCl₃.6H₂O (0.02) | 0 | 0 | 128 |

These experiments show that under conditions simulating transport and unloading, emission of hydrogen sulfide can be effectively reduced by using a suppressant according to the invention.

What is claimed is:

1. In the process for casting sulfur-asphalt compositions by mixing and/or heating mixtures comprising sulfur and asphalt in a weight ratio of at least 1:1 sulfur to asphalt, said mixing and/or heating being carried out at elevated temperatures not exceeding 175°C, the improvement which comprises: carrying out the mixing and/or heating step in the presence of a hydrogen sulfide suppressant selected from the class consisting of free radical inhibitors, redox catalysts and mixtures thereof.

2. The process according to claim 1, wherein the hydrogen sulfide suppressant is a redox catalyst.

3. The process according to claim 2, wherein the redox catalyst is selected from the class consisting of iodine, copper salts and coper oxides, iron salts and iron oxides and cobalt salts and cobalt oxides.

4. The process according to claim 3, wherein the redox catalyst is an iron salt selected from the class consisting of ferric chloride, ferrous chloride and their hydrates.

5. The process according to claim 4 wherein the redox catalyst is hydrated ferrous chloride.

6. The process according to claim 1, wherein the hydrogen sulfide suppresant is a free radical inhibitor.

7. The process according to claim 6, wherein the free radical inhibitor is selected from the class consisting of tetra-alkylthiuram disulfide, zinc dialkyl dithiocarbamates and diphenyl guanidide.

8. The process according to claim 1, wherein the sulfur-asphalt composition also contains a mineral aggregate.

9. The process according to claim 1, wherein the casting of the sulfur-asphalt composition is carried out at an elevated temperature not exceeding 150°C.

10. The process according to claim 1, wherein the hydrogen sulfide suppressant is added to the asphalt before it is mixed with the sulfur.

11. A castable sulfur-asphalt composition comprising sulfur and asphalt present in a weight ratio of at least 1:1 sulfur to asphalt and a hydrogen sulfide suppressant selected from the class consisting of free radical inhibitors, redox catalysts and mixtures thereof, said hydrogen sulfide suppressant being present in an amount sufficient to substantially suppress evolution of hydrogen sulfide from the composition when heated to elevated temperatures not exceeding 175°C.

12. The composition according to claim 11, wherein the hydrogen sulfide suppressant is a redox catalyst.

13. The composition according to claim 12, wherein the redox catalyst is selected from the class consisting of iodine, copper salts and copper oxides, iron salts and iron oxides and cobalt salts and cobalt oxides.

14. The composition according to claim 13, wherein the redox catalyst is an iron salt selected from the class consisting of ferric chloride, ferrous chloride and their hydrates.

15. The composition according to claim 14, wherein the redox catalyst is hydrated ferrous chloride.

16. The composition according to claim 11, wherein the hydrogen sulfide suppressant is a free inhibitor.

17. The composition according to claim 16, wherein the free radical inhibitor is selected from the class consisting of tetra-alkylthiuram disulfide, zinc dialkyl dithiocarbamates and diphenyl guanidide.

* * * * *